United States Patent [19]

Nelsen

[11] Patent Number: 5,802,581

[45] Date of Patent: Sep. 1, 1998

[54] SDRAM MEMORY CONTROLLER WITH MULTIPLE ARBITRATION POINTS DURING A MEMORY CYCLE

[75] Inventor: Pete Edward Nelsen, Plano, Tex.

[73] Assignee: Cirrus Logic, Inc., Fremont, Calif.

[21] Appl. No.: 577,584

[22] Filed: Dec. 22, 1995

[51] Int. Cl.$^6$ .................................................. G06F 13/18
[52] U.S. Cl. ........................ 711/151; 711/158; 395/729; 395/860
[58] Field of Search ........................... 395/550, 494, 395/496, 485, 474, 475, 477, 478, 479, 420, 288, 290, 728, 729, 730, 860; 711/151, 158

[56] References Cited

U.S. PATENT DOCUMENTS

| | | | |
|---|---|---|---|
| 4,845,664 | 7/1989 | Aichelmann, Jr. et al. | 364/900 |
| 4,959,776 | 9/1990 | Deefield et al. | 364/200 |
| 4,991,112 | 2/1991 | Callemyn | 364/518 |
| 5,353,429 | 10/1994 | Fitch | 395/425 |
| 5,448,742 | 9/1995 | Bhattacharya | 395/481 |
| 5,463,756 | 10/1995 | Saito et al. | 395/494 |
| 5,551,054 | 8/1996 | Packer | 395/843 |
| 5,696,912 | 12/1997 | Bicevskis et al. | 395/308 |
| 5,708,791 | 1/1998 | Davis | 395/432 |

*Primary Examiner*—Eddie P. Chan
*Assistant Examiner*—Hiep T. Nguyen
*Attorney, Agent, or Firm*—David H. Tannenbaum; Steven A. Shaw

[57] ABSTRACT

A computer system having a unified memory architecture (UMA) with a central SDRAM memory can be accessed by multiple devices. Arbitration logic receives and arbitrates among the memory requests. The memory controller indicates when the arbitration logic may issue a grant. The memory controller has two arbitration points during a memory cycle, an early one and a late one. A central processing unit (CPU), or other device, that misses the early arbitration point can still get memory access during the memory cycle by submitting a memory request before the late arbitration point.

22 Claims, 11 Drawing Sheets

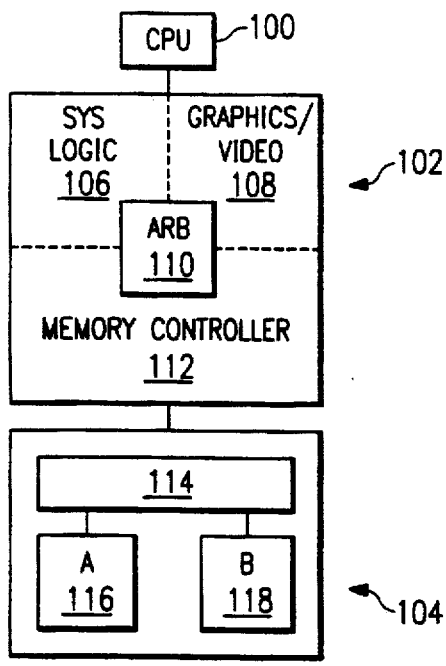
FIG. 1
| FIG. 2A | FIG. 2B | FIG. 2C |
FIG. 6
| FIG. 3A | FIG. 3B | FIG. 3C |
FIG. 7
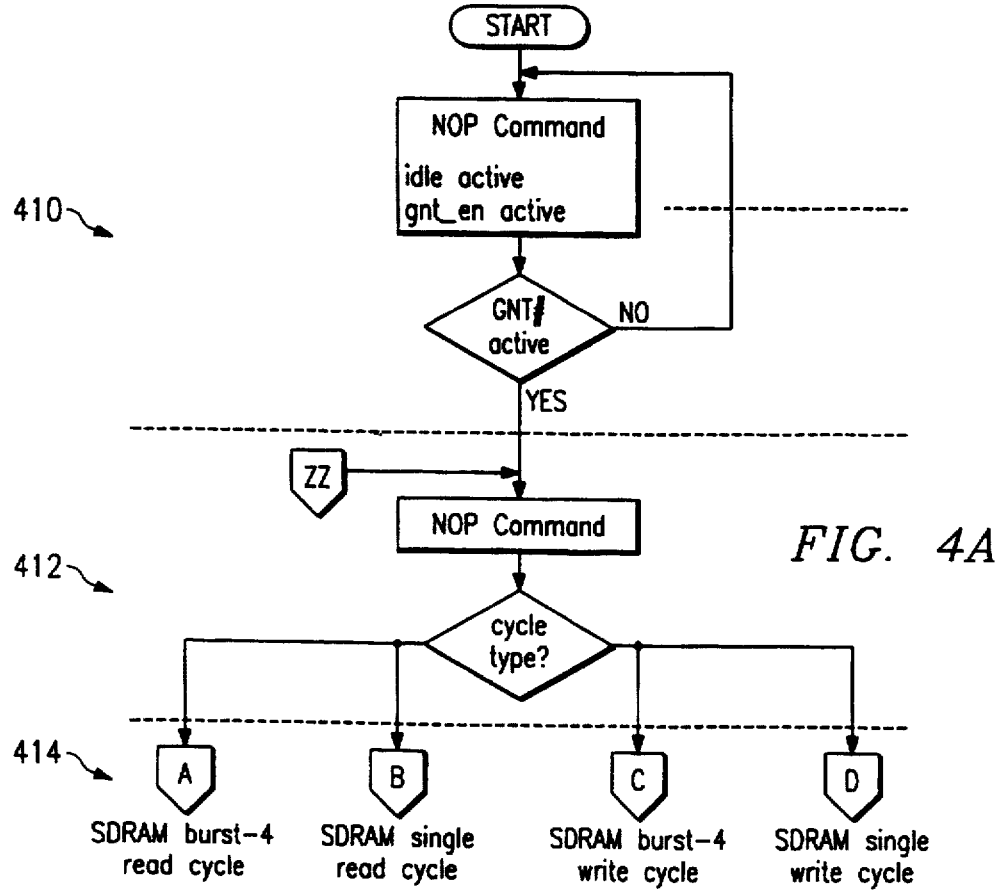
FIG. 4A

SDRAM MEMORY CONTROLLER WITH MULTIPLE ARBITRATION POINTS DURING A MEMORY CYCLE

RELATED APPLICATIONS

This application is related to Ser. No. 08/579,068, SDRAM MEMORY CONTROLLER SUPPORTING SINGLE DATA ACCESSES, Ser. No. 08/577,579, SDRAM DIMM PRESENCE DETECT INTERFACE, and Ser. No. 08/577,851, DYNAMIC ARBITRATION PRIORITY, filed concurrently with this application and hereby incorporated by reference herein. These applications are commonly assigned.

FIELD OF THE INVENTION

The invention pertains in general to a memory controller in a computer system and more particularly to an SDRAM memory controller in a computer system having a unified memory architecture.

BACKGROUND OF THE INVENTION

Prior art computer systems had separate memories for the central processing unit (CPU) and the graphics controller. The CPU and graphics controller each accessed their respective memories through separate interfaces. Thus, the two devices never contended with each other for memory access.

A computer system having a unified memory architecture (UMA), in contrast, has a single main memory accessed by both the CPU and the graphics controller. The CPU and graphics controller independently generate memory access requests to a memory controller.

An arbiter within the memory controller arbitrates the memory access requests. An arbitration point is at the beginning of each memory cycle. At the arbitration point, the arbiter grants a memory access to the requesting device having the highest priority. If the graphics controller or CPU does not submit an access request prior to an arbitration point, it must wait until the end of the current memory cycle for the next arbitration point before its request will be considered.

The graphics controller and CPU memory access requests have different natures. The graphics controller is constantly refreshing the display screen. Therefore, the graphics controller constantly reads long bursts of data from contiguous memory addresses. The CPU, in contrast, only issues memory access requests when required by its executing program. As a result, the CPU issues memory access requests at seemingly random intervals.

In order to support the graphics controller, the memory controller provides a burst four mode. Burst four mode reads or writes four data values during a single memory access. In addition, the memory controller supports gapless reads and writes in burst four mode to sequential memory requests in the same bank and row. In other words, the memory controller supports multiple burst four transfers without gaps between the data, as long as the memory accesses are in the same bank and row. In this manner, the memory controller can quickly respond to memory access requests from the graphics controller.

The CPU, like the graphics controller, usually reads and writes data in burst four mode. By using this mode, the CPU can fill a line in a cache with a single memory access request. However, since the CPU access requests come at random intervals, the CPU often issues a memory request just after an arbitration point. As a result, the CPU is forced to wait until the end of the memory cycle for the next arbitration point before its access request is considered or granted.

The performance of the entire computer system suffers while the CPU waits for memory access. Of course, a certain amount of latency is inevitable because multiple devices are sharing the same memory. However, the amount of latency must be minimized in order to increase system throughput. Therefore, there is a need in the art for a way to reduce the latency between memory access requests and access grants. More specifically, there is a need in the art for a way to quickly process memory access requests that are issued just after an arbitration point.

SUMMARY OF THE INVENTION

The above need is met by a memory controller having multiple arbitration points. A preferred embodiment of the present invention is implemented within a computer system having a unified memory architecture (UMA) with a central SDRAM memory that can be accessed by multiple devices. Arbitration logic receives and arbitrates among the memory requests. The memory controller indicates when the arbitration logic may issue a grant. The memory controller has two arbitration points during a memory cycle, an early one and a late one. A central processing unit (CPU), or other device, that misses the early arbitration point can still get memory access during the memory cycle by submitting a memory request before the late arbitration point.

A technical advantage of the present invention is that the latency period for memory access is reduced. As a whole, the CPU's memory requests are granted faster because of the late arbitration point.

Another technical advantage of the present invention is increased throughput of the computer system. The late arbitration point results in faster responses to memory access requests. Accordingly, the CPU spends more cycles processing data and less time waiting for it.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawings, in which:

FIG. 1 illustrates a high-level functional block diagram of a computer system according to the present invention.

FIGS. 4A–4C is a flow chart illustrating the logical steps followed by the memory controller during a burst four read cycle;

FIGS. 5A–5C is a flow chart illustrating the logical steps followed by the memory controller during a burst four write cycle;

FIG. 6 is a diagram illustrating how to construct FIGS. 2A–2C; and

FIG. 7 is a diagram illustrating how to construct FIGS. 3A–3C.

DESCRIPTION OF THE PREFERRED EMBODIMENTS

Figure 2A:
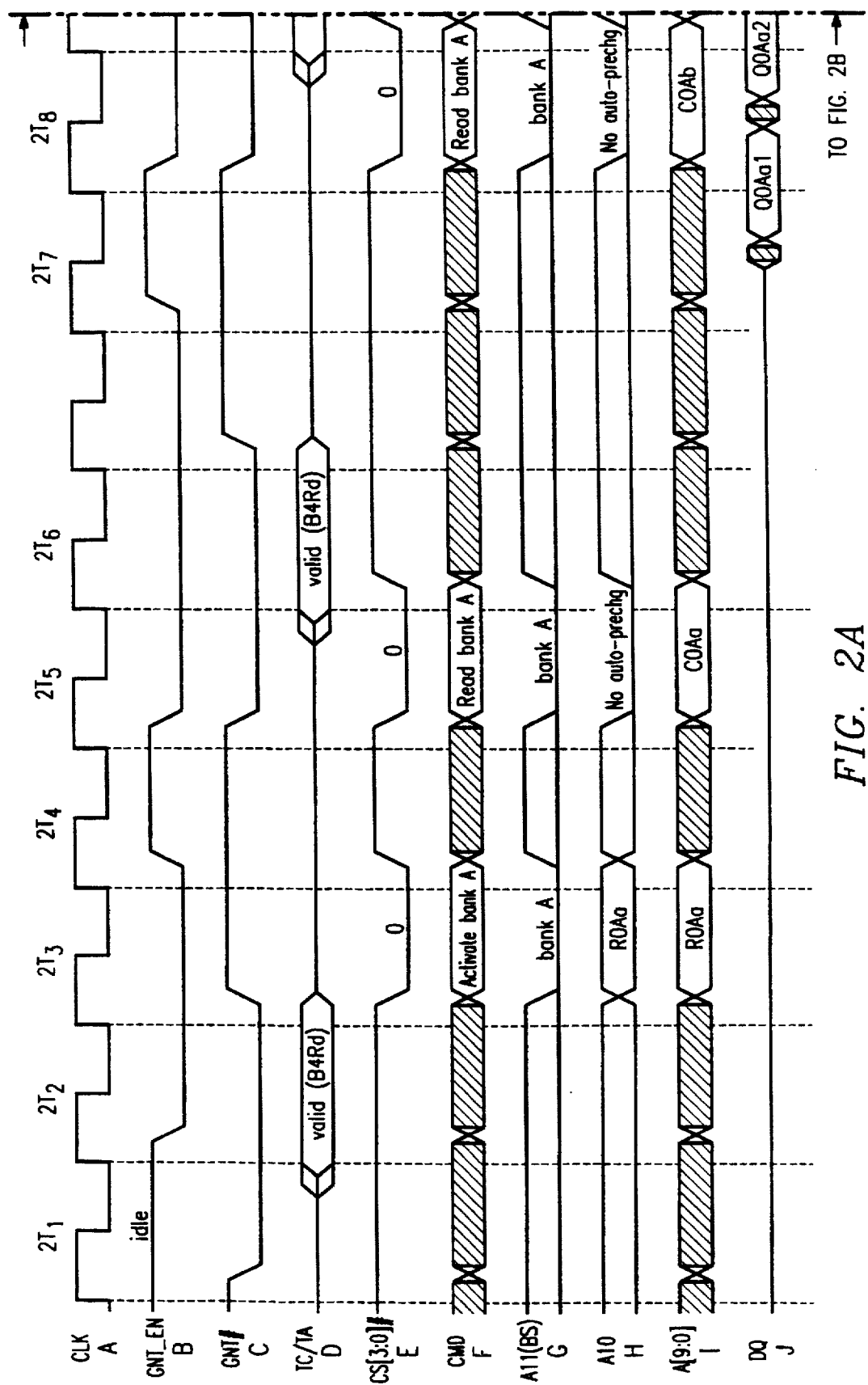
FIGS. 2A–2C is a timing diagram illustrating three burst four reads with arbitration occurring at the early arbitration point.

FIG. 1 illustrates a high-level functional block diagram of a computer system having a unified memory architecture (UMA) according to the present invention. Shown are central processing unit (CPU) 100 coupled to integrated controller 102. Integrated controller 102, in turn, is connected to synchronous dynamic random access memory (SDRAM) 104.

CPU 100 is preferably an X86 compatible CPU. However, the present invention will work equally well with any standard CPU capable of issuing memory access requests as described below.

Integrated logic 102 contains system logic 106, graphics/video controller (hereafter referred to as "graphics controller") 108, arbitration logic 110, and memory controller 112. System logic 106 contains the logic necessary to control the basic operation of the computer system, such as bus logic. Graphics controller 108 controls the generation of graphics data on a display screen (not shown). Graphics controller 108 may receive video data from a real-time video source separate from the computer system or display graphics data received from CPU 100. Arbitration logic 110 receives memory requests from the CPU 100, system logic 106, and graphics controller 108. Then, arbitration logic 110 arbitrates among and grants the highest priority request. Once a device's access request is granted, that device is connected directly to memory controller 112 and uses it 112 to access memory as described below.

It is important to note that arbitration logic 110 arbitrates among all devices in the computer system capable of issuing memory access requests. As discussed above, these devices include the CPU 100 and graphics controller 108. In addition, devices such as peripheral cards, DMA controllers, separate video controllers, and multimedia adapters can send memory access requests to arbitration logic 110 via system logic 106. For most of this discussion, the term "requesting device" is used to generically refer to any device in the computer system capable of issuing memory access requests.

SDRAM 104 includes digital interface 114 and has two banks of DRAM: bank A 116 and bank B 118. In order to better understand the operation of the present invention, SDRAM 104 will now be discussed in contrast with a DRAM. A DRAM has three signals called row address strobe (RAS), column address strobe (CAS), and write enable (WE). To start an access to a DRAM, the RAS is transitioned low when the row address is stable, then the CAS is transitioned low when the column address is stable. Next, the DRAM is either read from or written to, depending on the state of the write enable signal.

SDRAM 104 uses banks 116, 118 of regular DRAM memory controlled by digital interface 114. To access DRAM banks 116 and 118, the RAS, CAS, and write enable signals are encoded into digital commands sent to digital interface 114. Digital interface 114 translates the commands into regular DRAM bus cycles and then accesses DRAM banks 116, 118.

The primary advantages of using a SDRAM instead of DRAM are increased speed and flexibility. Since digital interface 114 controls DRAM banks 116, 118, the banks can be accessed individually. Therefore, there can be active rows in each bank open at the same time.

Figure 2B:
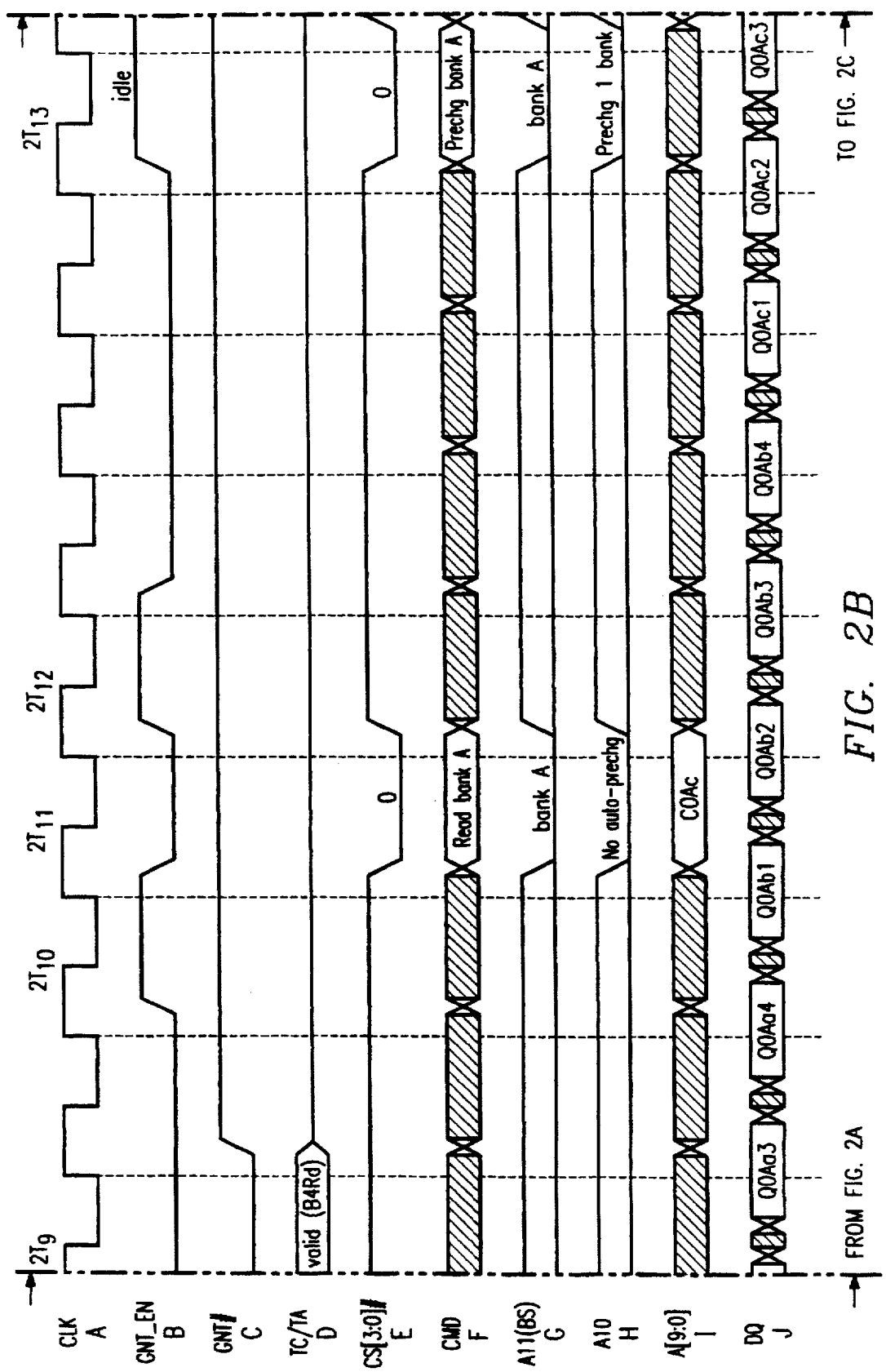
Figure 2C:
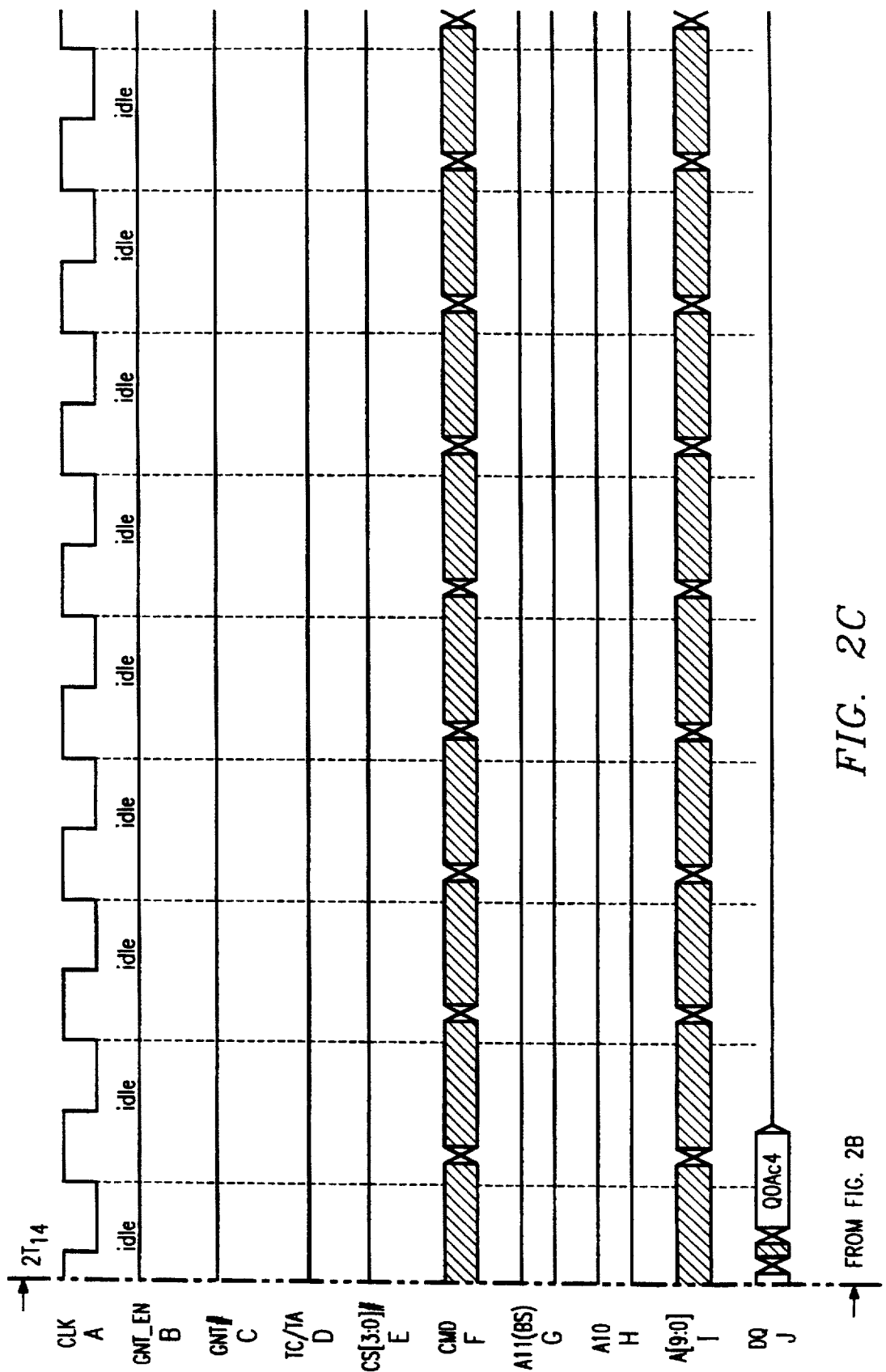

FIGS. 2A–2C shows a timing diagram of the signals transferred between integrated controller 102 and SDRAM 104 during a series of three gapless burst four reads. Shown are 10 signals: CLK A, GNT_EN B, GNT# C, TC/TA D, CS E, CMD F, A11 G, A10 H, A[9:0] I, and DQ J.

CLK A is a standard clock signal used to define boundaries for the other signals. GNT_EN B, when high, tells arbitration logic 110 that a memory grant can be accepted. GNT# C is active when low and indicates to the memory controller 112 and the requesting device that the device is being granted a memory access. TC/TA D contains the address of the memory transfer and cycle type information, such as whether the cycle is a read or write or a single transfer or burst four.

CS# E is the chip select for the SDRAM. CMD F consists of the SDRAM signals RAS, CAS, and WE, these three bits are encoded into the SDRAM commands such as activate/deactivate bank, read, write, and refresh. A11 G selects the bank of DRAM to use.

A10 H is an address bit and has different functions depending on the commands being carried out. During an activate command, A10 H contains the most significant row address bit. During a read or write command, A10 H indicates whether there is going to be an auto-precharge. During a precharge or deactivate command, A10 H indicates whether only one or both banks should be affected.

A[9:0] I contains either the row or column address. During an activate command, A[9:0] I contains the row address. During a read or write command, it contains a column address. DQ J bidirectionally carries data being written to or read from memory.

As stated previously, FIGS. 2A–2C shows a series of three burst four reads followed by an idle bus. This series of reads is typical of a memory access by graphics controller 108 when refreshing the display screen. At cycle 2T1, GNT# C goes low, indicating that a requesting device has been granted access to memory. At cycle 2T2, the requesting device transfers cycle information over TC/TA D indicating a burst four read. As shown by the CMD F and A11 G signals at cycle 2T3, the memory controller activates bank A of the SDRAM.

Cycle 2T4 is the first arbitration point after the burst four read that began at cycle 2T1. The arbitration point is the point at which the memory controller indicates it can accept a grant and support a gapless burst four transfer. At cycle 2T5, GNT# C transitions low, indicating that a requesting device has been granted memory access. At cycle 2T6, the TC/TA signal D indicates that this memory cycle is also a burst four read.

Cycle 2T7 is the next arbitration point. At cycle 2T8, GNT# C transitions low, once again indicating that a requesting device has been granted a memory access. At cycle 2T9, the TC/TA signal D indicates that this memory cycle is also a burst four read. As shown on DQ J, the cycle 2T7 also marks the first burst four data read from memory. The data sent over DQ J beginning at cycle 2T7 is in response to the read cycle begun at cycle 2T1.

Cycle 2T10 is the next early arbitration point. At cycle 2T11, GNT_EN B drops, indicating that the arbitration point has passed. However, GNT# C remains high, indicating that no device was requesting memory at that arbitration point. At cycle 2T12, GNT_EN B again transitions, indicating another arbitration point. The arbitration point at cycle 2T12 is the second, or late, arbitration point.

If a device issues a memory request at cycle 2T11, prior art arbitration circuitry would force the device to wait until the beginning of the next memory cycle before granting the request. The present invention, in contrast, introduces a second arbitration point at cycle 2T12. Thus, a device that issues a memory request by cycle 2T12 can receive a memory access during the memory cycle that began at cycle 2T9.

In the example of FIGS. 2A–2C, however, no device requests memory at the second, or late, arbitration point. Therefore, any device requiring memory access will have to wait until the end of the current memory cycle, cycle 2T14, before the access is granted. Finally, note that the gapless burst four memory transfers begun at cycle 2T7 finish at cycle 2T14.

Figure 3A:
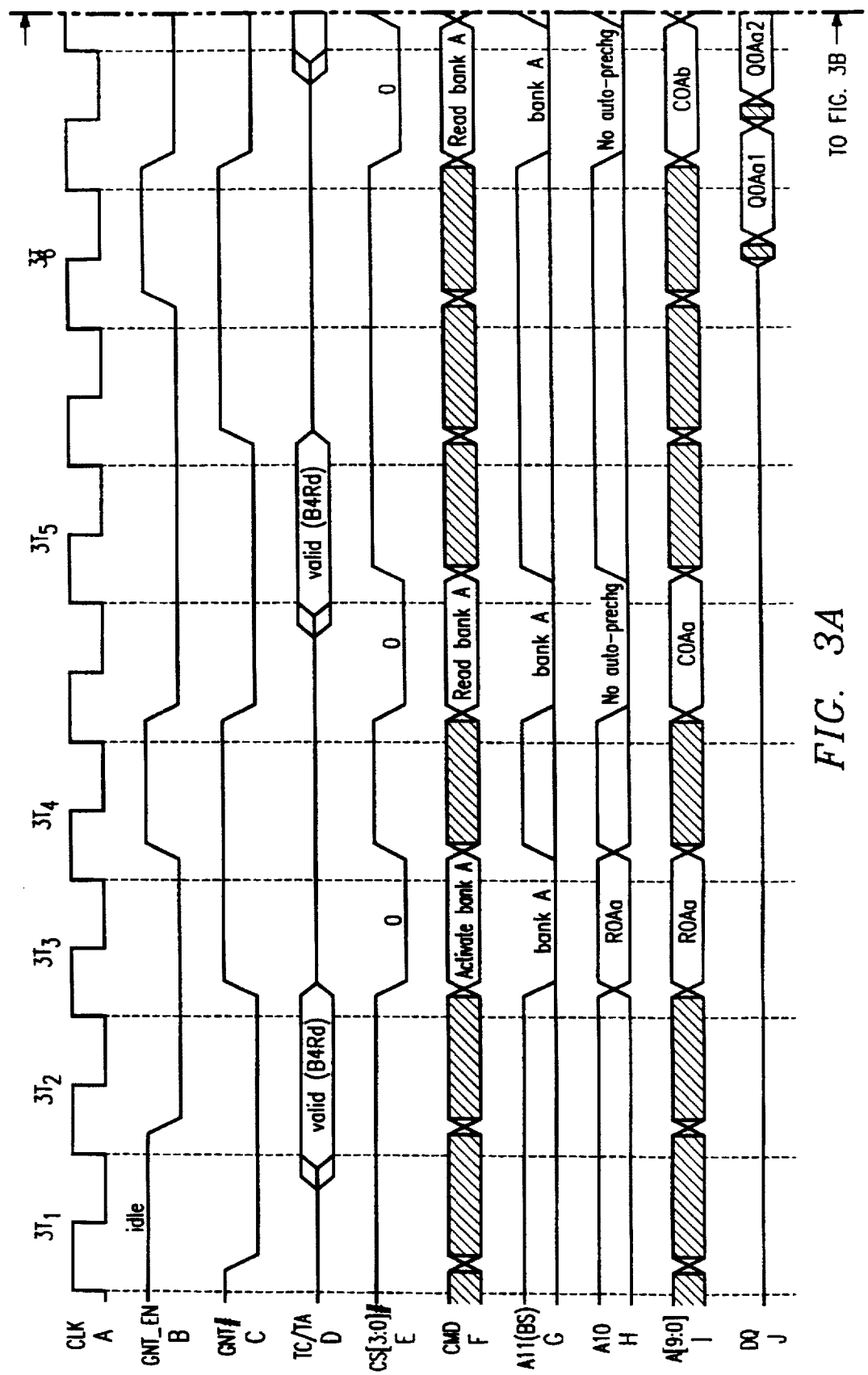
FIGS. 3A–3C is a timing diagram illustrating three burst four reads followed by a burst four read where arbitration occurred at the late arbitration point.
Figure 3B:
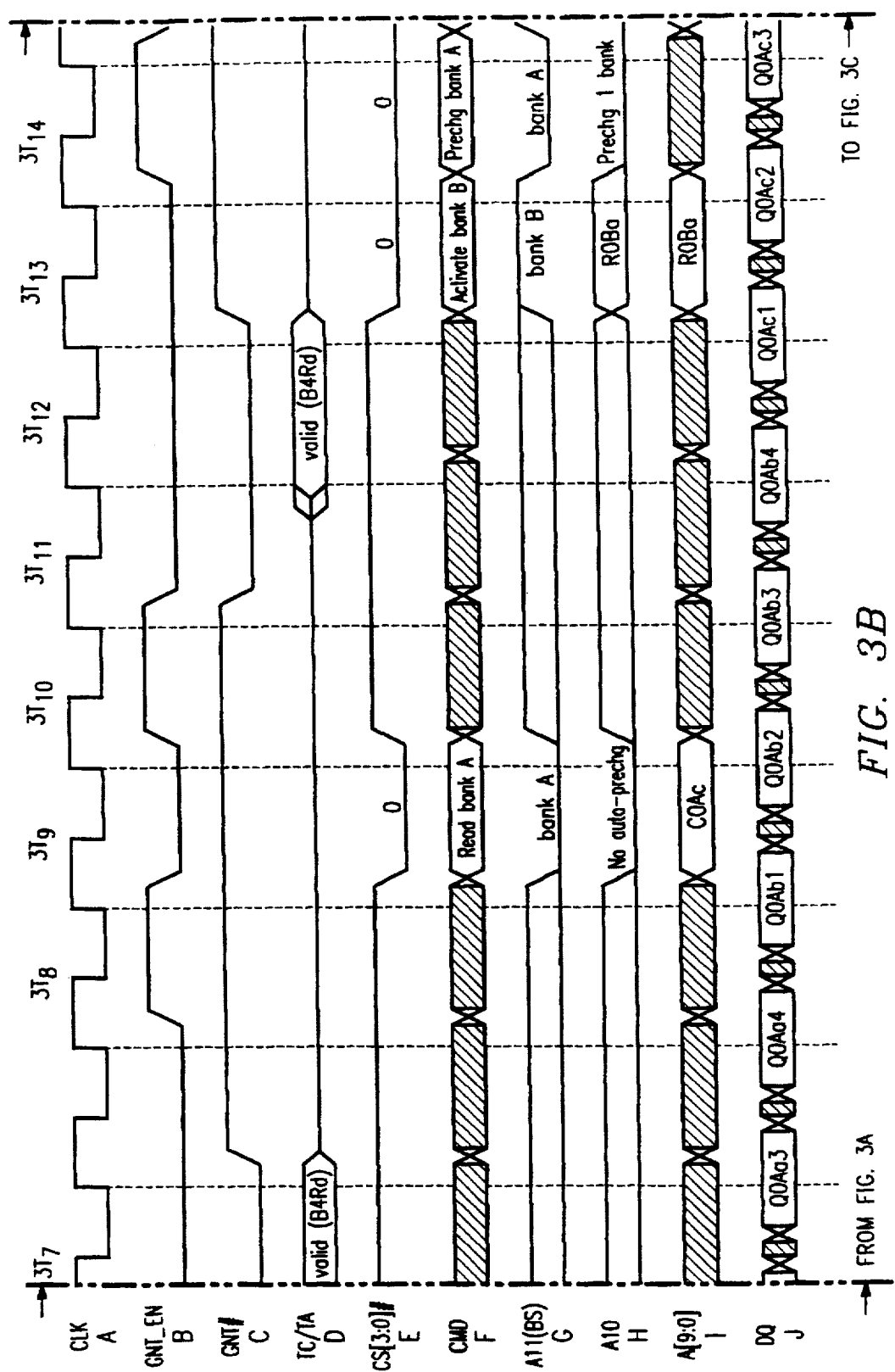
Figure 3C:
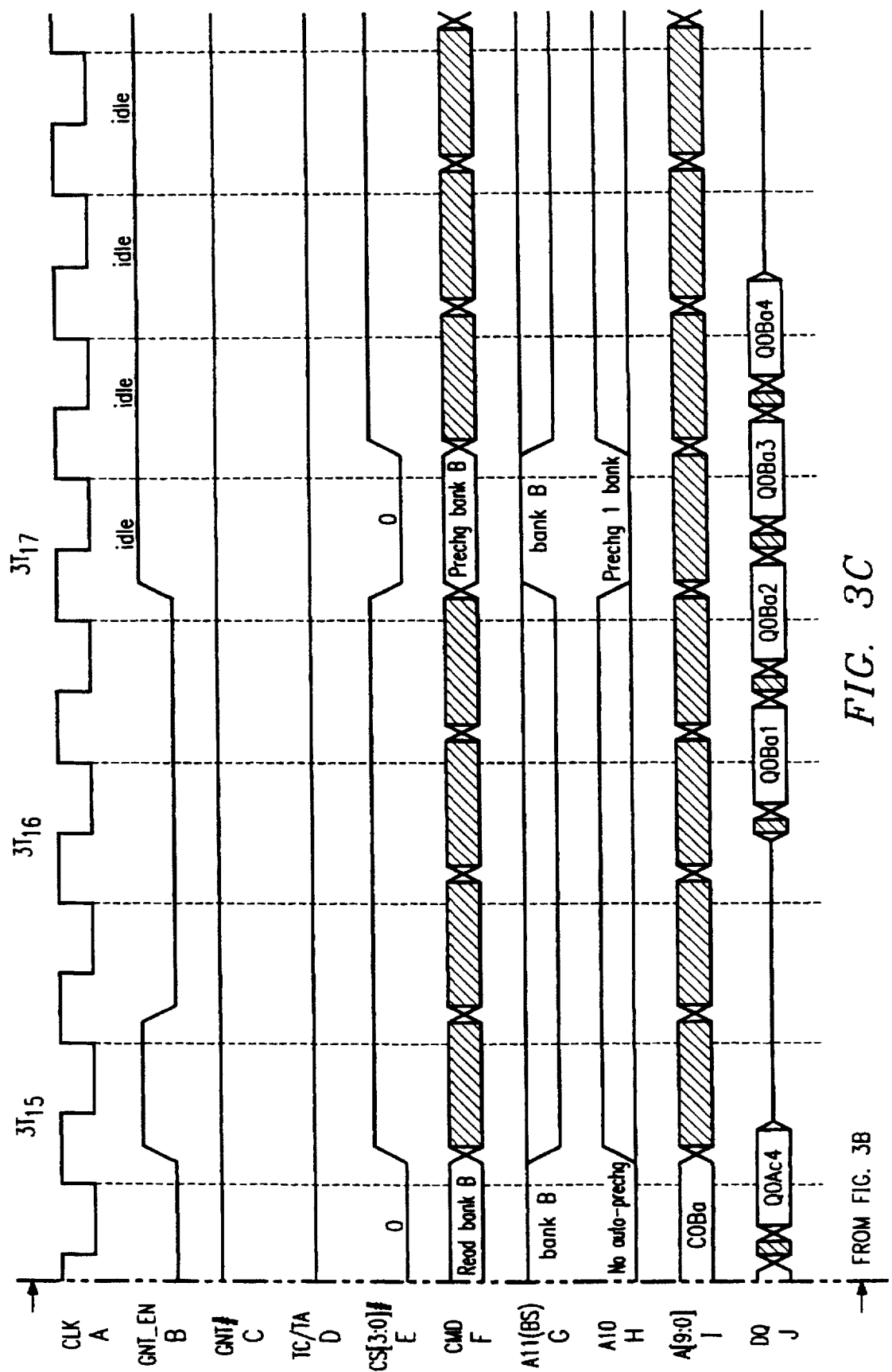

FIGS. 3A–3C is a timing diagram illustrating three burst four reads on bank A 116 followed by a late burst four read on bank B 118. Note that FIGS. 3A–3C is substantially similar to FIGS. 2A–2C until the late arbitration point (2T12 in FIGS. 2A–2C). At cycle 3T1, a device gains access to memory, as indicated by the drop in GNT# C. At cycle 3T2, the device sends a burst four read signal on TC/TA D. As indicated by the CMD F and A11 G signals at cycle 3T3, this burst four read will be performed on bank A 116.

Cycle 3T4 is the arbitration point for the next memory cycle. As indicated by TC/TA D at cycle 3T5, the next memory cycle is a burst four read. Cycle 3T6 is the next arbitration point. Once again, TC/TA D at cycle 3T7 indicates that the next memory cycle is a burst four read.

Cycle 3T8 is the next arbitration point. At cycle 3T9, however, GNT# C remains high, indicating that no device issued a memory request before or during the arbitration point at cycle 3T8. Assume, however, that a device issued a memory request during cycle 3T9.

Cycle T10 is the late arbitration point. At cycle 3T11, GNT# C transitions low, indicating that a device was granted a memory access at the late arbitration point. At cycle 3T12, the device sends a signal over TC/TA D indicating that the access is a burst four read. At cycle 3T13, A11 G transitions high, indicating that this burst four read will be performed on bank B 118.

At cycle 3T14, GNT_EN B transitions high, indicating that cycle 3T14 is an arbitration point. No device requests access at cycle 3T14, so the arbitration controller produces a late arbitration point at cycle 3T15. No device, however, requests access during this late arbitration point. Therefore, the memory bus goes idle at cycle 3T17 and remains idle until an access request is received.

Note that the data from bank B 118 is carried on DQ J starting at cycle 3T16. The gap between the previous burst four reads and the burst four read beginning at cycle 3T16 is due to the overhead of preparing bank B for access.

The sequence illustrated by the timing diagram of FIG. 3 is typical of when graphics controller 108 performs a series of memory accesses and then CPU 100 issues a memory request after an arbitration point. The graphics controller's 108 reads are sequential (same bank, same row) because the controller 108 is refreshing the display screen. CPU 100's memory accesses, in contrast, arrive at irregular intervals because CPU 100 only requires memory access when required by the program it is executing. The late arbitration point allows the memory controller to quickly respond to CPU 100's access request.

Figure 4B:
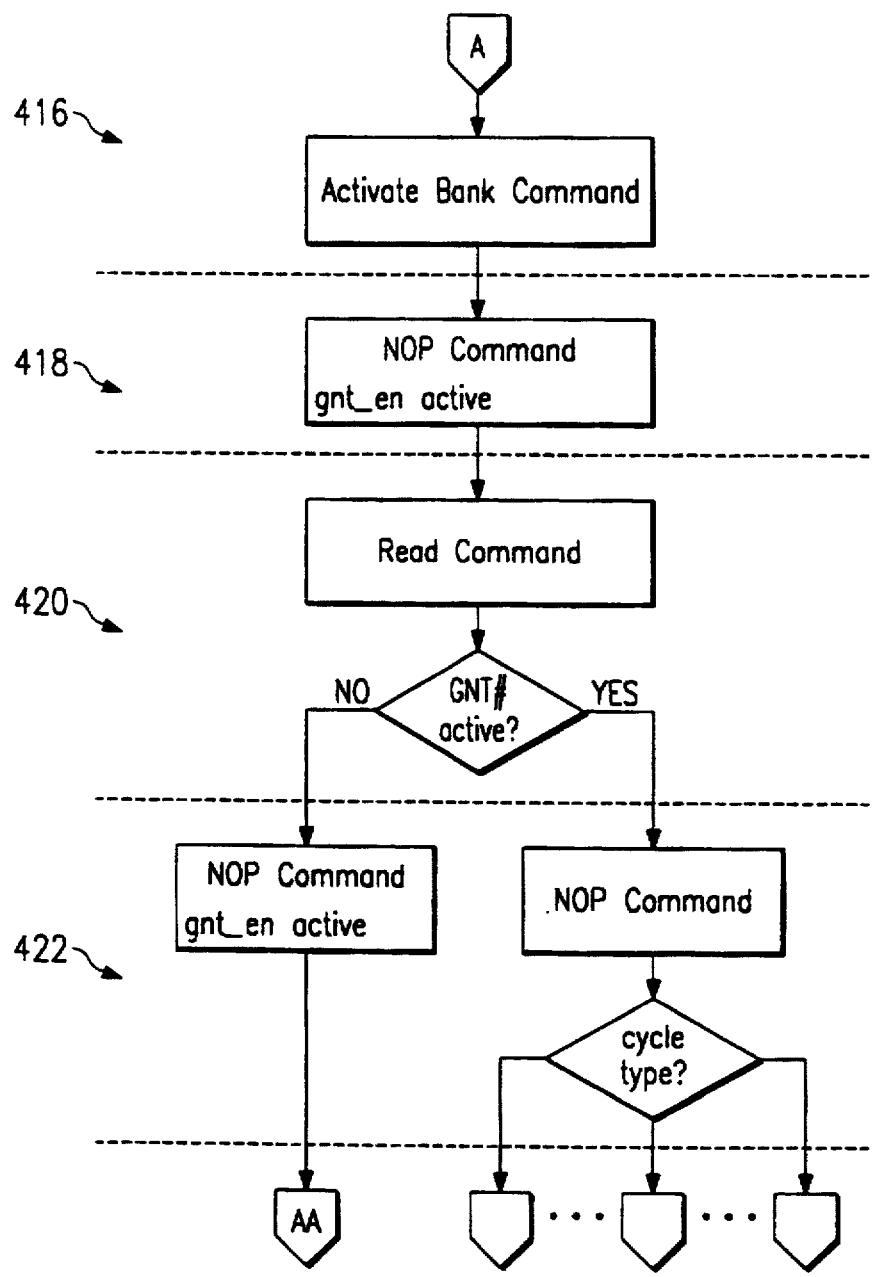
Figure 4C:
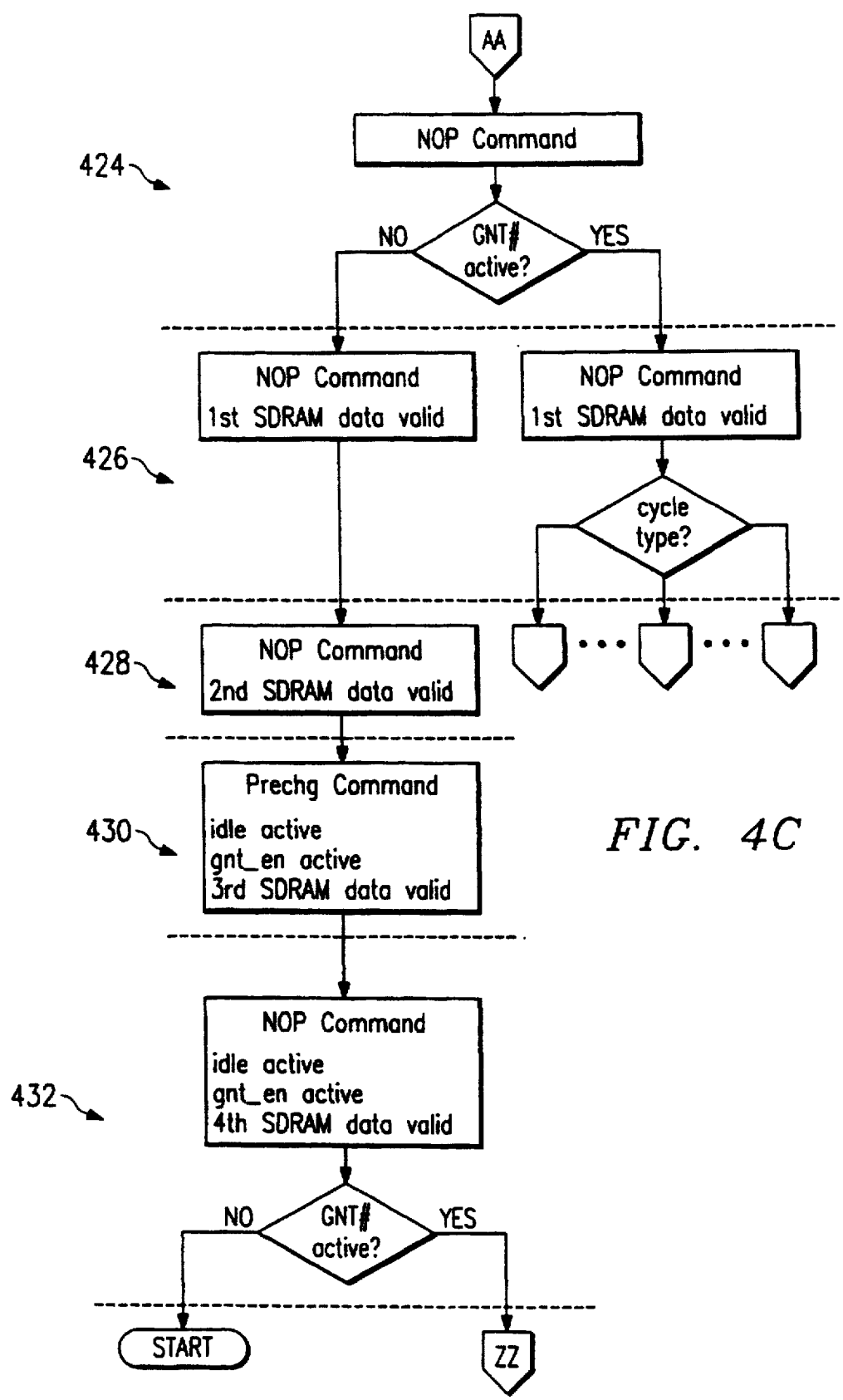

FIGS. 4A–4C is a flow chart illustrating the behavior of memory controller 112 during a single burst four read cycle. When explaining FIGS. 4A–4C below, occasional reference is made to the timing diagram of FIGS. 2A–2C. However, it is important to note that FIG. 2 illustrates a specific case while FIGS. 4A–4C is more general in nature.

Each step of FIGS. 4A–4C is separated by a dashed line indicating the edge of a clock cycle (CLK A). At step 410, memory controller 112 is idle and GNT_EN B is active. If GNT# C is active, then memory controller 112 waits a cycle (step 412) and then begins the cycle indicated by the TC/TA D signal (step 414).

Assuming that the cycle is a burst four read, memory controller 112 issues an activate command on CMD F signal (step 416). Then, at step 418, the memory controller indicates an arbitration point by activating GNT_EN B. At step 420, memory controller 112 issues a read command on CMD B.

Also at step 420, memory controller 112 determines whether GNT# C is active. If GNT# C is active, memory controller 112 begins the new memory cycle indicated by the TC/TA D signal (step 422). Otherwise, memory controller 112 signals the late arbitration point by activating GNT_EN B (step 422).

Assuming that memory controller 112 signals the late arbitration point, memory controller 112 again checks to determine whether GNT# C goes active (step 424). If active, memory controller 112 begins the next cycle at step 426. Otherwise, memory controller 112 continues executing the current memory cycle.

At step 426, the first data element of the burst four read arrives on DQ J. At step 428, the second data element arrives. At step 430, the third data element arrives. In addition, at step 430 the memory controller precharges the active SDRAM bank and signals that it can accept another memory request by raising IDLE (not shown in FIGS. 2A–2C) and GNT_EN B. At step 432, the final data element arrives and memory controller 112 either responds to any active GNT# C signal or returns to start 410.

Figure 5A:
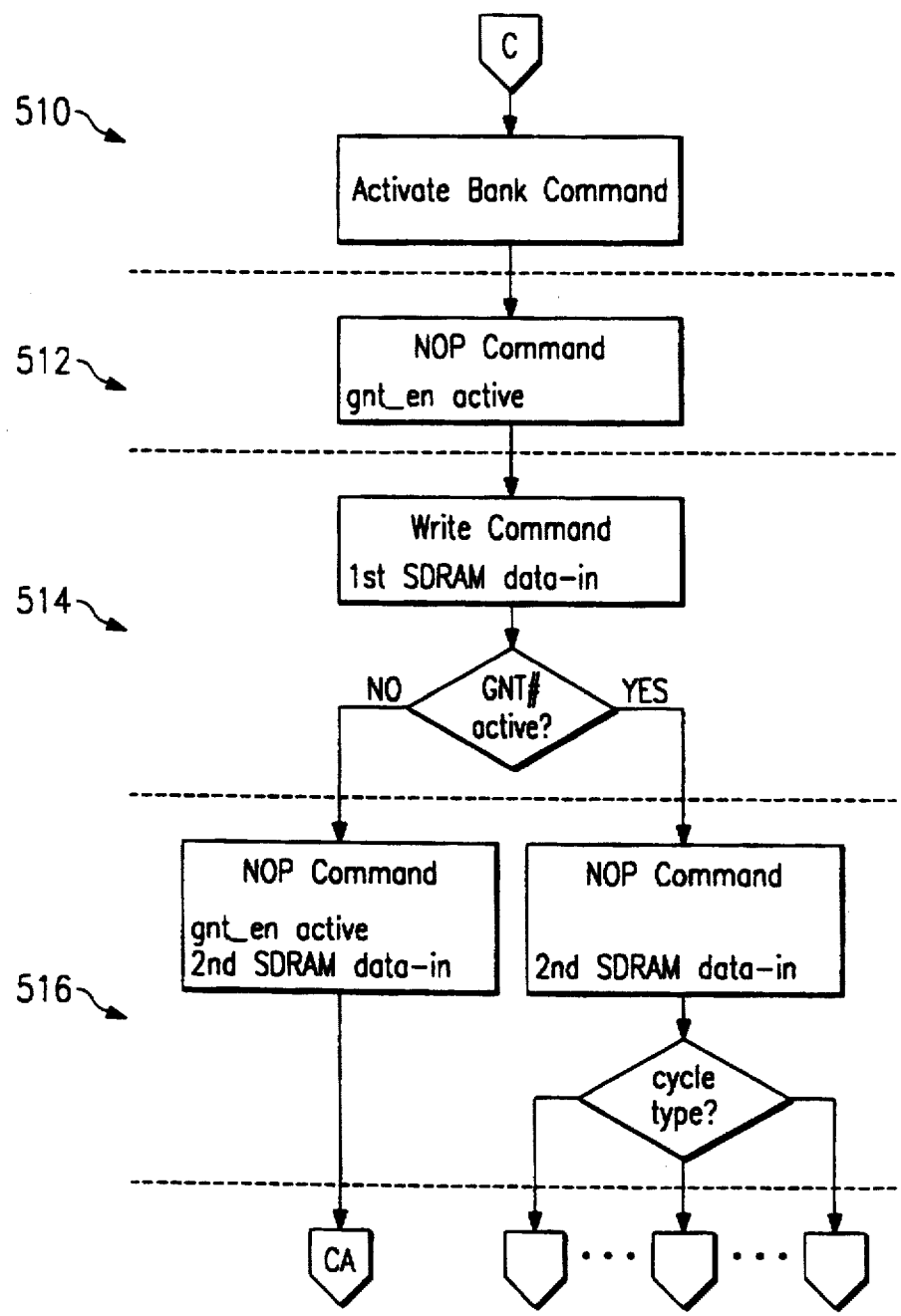
Figure 5B:
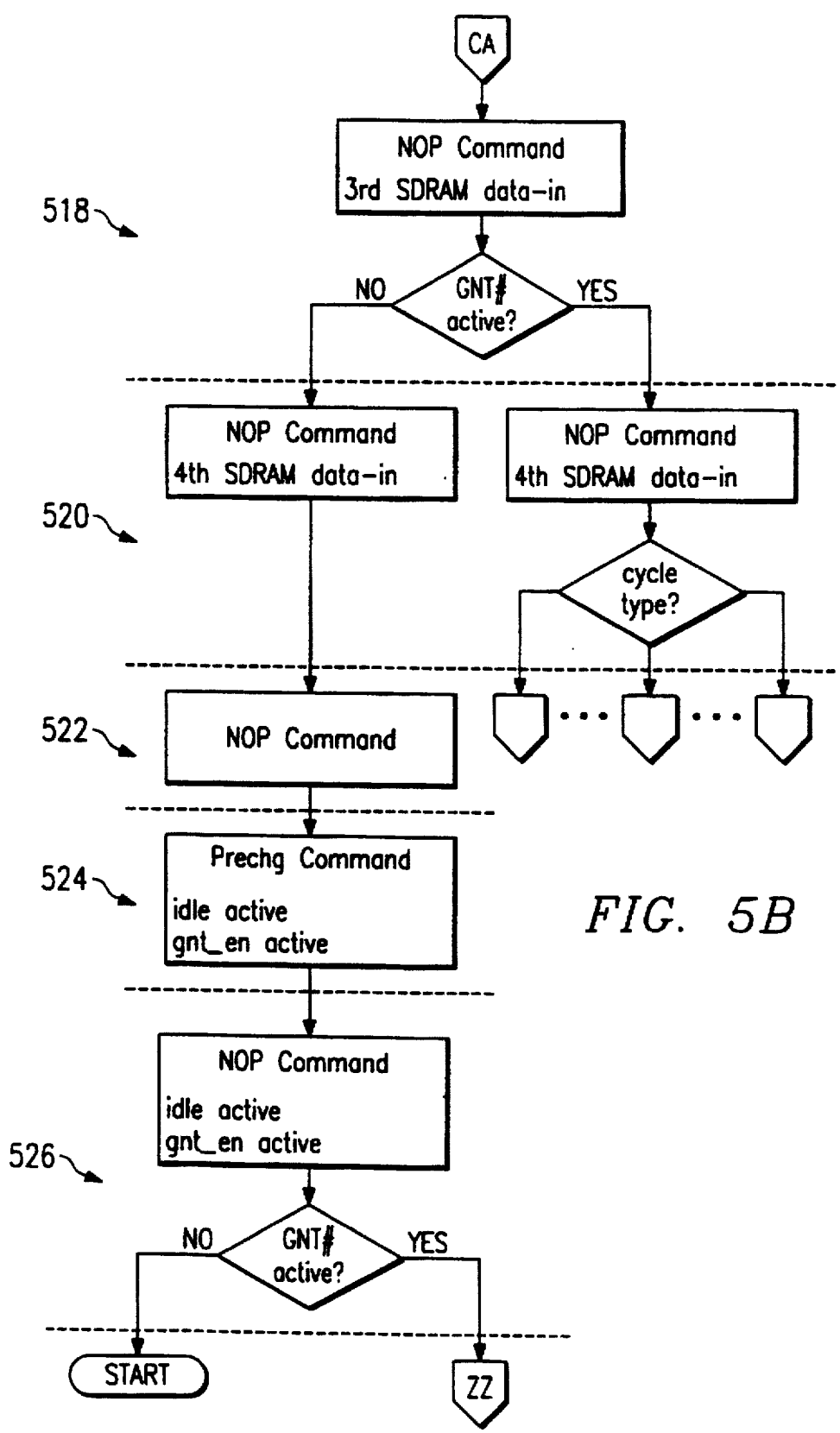

FIGS. 5A–5C is a flow chart illustrating the behavior of memory controller 112 during a single burst four write cycle. Step 510 continues from step 414 of FIGS. 4A–4C. At step 510, memory controller 112 activates the requested memory bank as indicated by the A11 G signal. At step 512, memory controller 112 activates GNT_EN B to indicate another arbitration point.

At step 514, memory controller 112 receives the first data element of the burst four write from the requesting device. In addition, memory controller 112 determines whether GNT# B is active. If so, memory controller 112 receives the cycle type information at step 516. Otherwise, memory controller signals the late arbitration point at step 516. Also at step 516, memory controller 112 receives the second data element.

Assuming that memory controller 112 signals the late arbitration point at step 516, memory controller 112 then checks to determine whether GNT# C goes active (step 518). In addition, memory controller 112 also receives the third data element.

If GNT# C goes active at step 518, memory controller 112 receives the cycle type information at step 520. Otherwise, memory controller 112 continues executing the current memory cycle. In addition, memory controller 112 receives the fourth data element at this step. At step 524 the memory controller precharges the active SDRAM bank and signals that it is idle and can accept another memory request by raising IDLE (not shown in FIGS. 2A–2C) and GNT_EN B. At step 526, memory controller 112 either responds to an active GNT# C signal or returns to start 410.

The figures discussed above show the late arbitration point occurring at specific clock cycles within a memory cycle. It must be noted, however, that the exact timing of the late arbitration point can vary and still be within the scope of the present invention. An inventive aspect of the present invention is that a requesting device can miss a memory cycle's arbitration point, yet still be served within that memory cycle.

A further embodiment of the present invention provides for servicing of memory requests by a single requesting device. For example, the CPU issues memory requests at random intervals and it usually reads and writes data in burst four mode. The random memory request intervals are determined by the requirements of the executing program. As a result, the CPU may issue a second memory request while the memory controller is servicing a first CPU memory request. If the second request is made after the early arbitration point, the present invention allows the second CPU memory request to be served within the memory cycle at the late arbitration point, thereby reducing the latency period between the random memory requests from the CPU.

Although the present invention and its advantages have been described in detail, it should be understood that various changes, substitutions and alterations can be made herein without departing from the spirit and scope of the invention as defined by the appended claims.

I claim:

1. A computer system having a memory and a first device capable of issuing memory access requests, comprising:
   a memory controller for controlling access to memory, the memory controller comprising circuitry capable of signaling two arbitration points in a memory cycle, wherein said memory cycle is a time interval during which either a single transfer or a burst four memory access is carried out; and
   arbitration circuitry for receiving and arbitrating the memory access requests and granting a memory access request when the memory controller signals an arbitration point;
   wherein the memory controller signals an early arbitration point in the memory cycle and, if the arbitration circuitry does not grant a memory access request at the early arbitration point the memory controller signals a late arbitration point later in the memory cycle.

2. The computer system of claim 1, wherein the memory is an SDRAM.

3. The computer system of claim 1, wherein the memory controller, arbitration circuitry, and memory form a unified memory architecture.

4. The computer system of claim 1, further comprising:
   a second device capable of issuing memory requests;
   wherein, the first and second devices can simultaneously issue memory access requests and the arbitration circuitry arbitrates among the requests.

5. The computer system of claim 4, wherein the first and second devices each have a priority and the arbitration circuitry grants a memory access request to the device having the highest priority.

6. The computer system of claim 4, wherein the first device is a graphics controller and the second device is a CPU.

7. The computer system of claim 1, wherein the memory access requests comprise a burst four read.

8. The computer system of claim 1, wherein the memory access requests comprise a burst four write.

9. A computer system having a memory having memory cycles and a plurality of requesting devices capable of issuing memory access requests, comprising:
   memory control means for signaling arbitration points within a memory cycle, the arbitration points indicating when a memory access request may be granted, wherein said memory cycle is a time interval during which either a single transfer or a burst four memory access is carried out; and
   granting means for granting a memory access request in response to a signaled arbitration point;
   wherein the memory control means signals an early arbitration point in the memory cycle and, if the arbitration circuitry does not grant a memory access request at the early arbitration point, the memory control means signals a late arbitration point later in the memory cycle.

10. The computer system of claim 9, wherein each of the memory access requests has a priority, and the granting means further comprises:
    arbitration means for arbitrating the memory access requests and granting the highest priority request.

11. The computer system of claim 9, wherein the memory is an SDRAM.

12. The computer system of claim 9, wherein the computer system has a unified memory architecture.

13. The computer system of claim 9, wherein the plurality of requesting devices comprises:
    a graphics controller; and
    a CPU.

14. The computer system of claim 9, wherein the memory access requests comprise a burst four read.

15. The computer system of claim 9, wherein the memory access requests comprise a burst four write.

16. A method of arbitrating among a plurality of requesting devices capable of issuing memory access requests to a memory in a computer system, comprising the steps of:
    when the requesting devices issue memory access requests, receiving the memory access requests;
    when the memory access requests are received, granting memory access to a requesting device in response to a signal indicating an early arbitration point in the memory cycle; and
    when the memory access is not granted at the early arbitration point, signaling a late arbitration point later in the memory cycle at which a memory access may be granted, wherein the memory has memory cycles and the early and late arbitration points occur within a single memory cycle, wherein said memory cycle is a time interval during which either a single transfer or a burst four memory access is carried out.

17. The method of claim 16, wherein each of the requesting devices has a priority and the granting step further comprises the step of:
    arbitrating the memory access requests and granting the memory request from the highest priority requesting device.

18. The method claim 16, wherein the memory is an SDRAM.

19. The method of claim 16, wherein the computer system has a unified memory architecture.

20. The method of claim 16, wherein the plurality of requesting devices comprises:
    a graphics controller; and
    a CPU.

21. The method of claim 16, wherein the memory access requests comprise: a burst four read request.

22. The method of claim 16, wherein the memory access requests comprise: a burst four write request.

* * * * *